United States Patent
Mueller et al.

(10) Patent No.: US 9,573,570 B2
(45) Date of Patent: Feb. 21, 2017

(54) DRIVE UNIT FOR AIRCRAFT LANDING GEAR WITH INTEGRATED COOLING

(75) Inventors: Anton Mueller, Tutzing (DE); Johann Oswald, Eschenlohe (DE)

(73) Assignee: L-3 COMMUNICATIONS MAGNET-MOTOR GMBH, Starnberg (DE)

( * ) Notice: Subject to any disclaimer, the term of this patent is extended or adjusted under 35 U.S.C. 154(b) by 236 days.

(21) Appl. No.: 14/380,476

(22) PCT Filed: Feb. 23, 2012

(86) PCT No.: PCT/EP2012/053106
§ 371 (c)(1),
(2), (4) Date: Dec. 19, 2014

(87) PCT Pub. No.: WO2013/123993
PCT Pub. Date: Aug. 29, 2013

(65) Prior Publication Data
US 2015/0097078 A1    Apr. 9, 2015

(51) Int. Cl.
*B60T 5/00*        (2006.01)
*B64C 25/40*       (2006.01)
*B64C 25/42*       (2006.01)

(52) U.S. Cl.
CPC ............... *B60T 5/00* (2013.01); *B64C 25/405* (2013.01); *B64C 25/42* (2013.01); *Y02T 50/823* (2013.01)

(58) Field of Classification Search
CPC ....... B64D 13/006; B64D 13/00; B64C 25/36; B64C 25/34; B64C 25/405; B60T 5/00
See application file for complete search history.

(56) References Cited

U.S. PATENT DOCUMENTS 2,042,750 A * 6/1936 Van Halteren ........ F16D 65/827
                                                188/2 R
2,121,504 A * 6/1938 Martin ..................... B60G 3/26
                                                 180/89.1
(Continued)

FOREIGN PATENT DOCUMENTS

DE          4235815      4/1994
DE        102008006295   7/2009
(Continued)

OTHER PUBLICATIONS

Bender et al., AeroSpace Engineering, vol. 16, No. 3, pp. 13-16, Mar. 1996, ISSN: 07362536, titled "Landing Gear Structural Integrity".

(Continued)

*Primary Examiner* — Tien Dinh
*Assistant Examiner* — Alexander V Giczy
(74) *Attorney, Agent, or Firm* — Brinks Gilson & Lione

(57) ABSTRACT

A drive unit for an aircraft ground wheel associated with a brake unit for braking the ground wheel includes: a driving motor drivingly coupleable to the ground wheel; and a cooling system including at least a drive cooling unit configured to generate a drive cooling air stream for cooling the drive unit and a brake cooling unit configured to generate a brake cooling air stream by sucking in air from the brake unit. A method of controlling such drive unit in which the cooling system is driven by the driving motor of the drive unit includes: decoupling the driving motor from the ground wheel and increasing the rotational speed of the driving motor to increase the amount of generated drive cooling air, when an operating condition of the ground wheel and/or of the drive unit is switched from a propulsion mode to a non-propulsion mode.

15 Claims, 5 Drawing Sheets

(56) References Cited

U.S. PATENT DOCUMENTS

| | | | | |
|---|---|---|---|---|
| 2,580,001 | A * | 12/1951 | Butler | B60B 19/10 152/153 |
| 3,251,437 | A * | 5/1966 | Moyer | F16D 55/40 188/264 AA |
| 3,301,357 | A * | 1/1967 | Cleminson | B60B 19/10 188/264 AA |
| 6,419,056 | B1 * | 7/2002 | Dyko | B64C 25/36 188/264 A |
| 6,615,958 | B1 | 9/2003 | Baden | |
| 7,445,178 | B2 * | 11/2008 | McCoskey | B64F 1/32 244/100 R |
| 2002/0047346 | A1 | 4/2002 | Miekka et al. | |
| 2007/0284939 | A1 * | 12/2007 | Charles | B60T 1/10 303/152 |
| 2009/0152055 | A1 * | 6/2009 | Cox | F16D 65/847 188/71.6 |
| 2010/0187897 | A1 * | 7/2010 | Caule | B64C 25/36 301/6.3 |
| 2011/0297786 | A1 * | 12/2011 | Sweet | B64C 25/405 244/103 R |
| 2012/0104159 | A1 * | 5/2012 | Charles | B64C 25/405 244/50 |
| 2013/0062466 | A1 * | 3/2013 | Sweet | B64C 25/405 244/103 R |

FOREIGN PATENT DOCUMENTS

| | | | |
|---|---|---|---|
| GB | WO 0009373 A1 * | 2/2000 | B60T 5/00 |
| RU | 2 222 473 C1 | 1/2004 | |
| RU | 112 673 U1 | 10/2011 | |
| WO | WO 9529094 | 11/1995 | |
| WO | WO2009086804 | 7/2009 | |
| WO | WO 2010/003911 A1 | 1/2010 | |
| WO | WO 2011/023505 | 3/2011 | |

OTHER PUBLICATIONS

International Search Report issued in corresponding application PCT/EP2012/053106, Nov. 8, 2012, pp. 1-3.
Gorodissky, Application No. 2014138248/11 (062025) dated Feb. 23, 2012, Decision on Grant Patent for Invention.

* cited by examiner

DRIVE UNIT FOR AIRCRAFT LANDING GEAR WITH INTEGRATED COOLING

RELATED APPLICATIONS

The present application claims the benefit under 35 U.S.C. §371 of International Patent Application No. PCT/EP/2012/053106, having an international filing date of Feb. 23, 2012, and entitled "DRIVE UNIT FOR AIRCRAFT LANDING GER WITH INTEGRATED COOLING," the entire content of which is incorporated herein by reference.

FIELD

The present invention relates in general to a drive unit for an aircraft running gear and to an aircraft running gear comprising a drive unit. In more detail, the present invention is directed to the integration of cooling means for dissipating heat produced by the drive unit and/or other devices associated with the running gear, such as a brake unit of the running gear.

BACKGROUND

Aircraft—also referred to as airplanes herein—use their main engines such as gas turbine, turbo-fan or turbo-prop engines for taxiing on the ground, usually on an airfield or a maneuvering area of an airport. As the main engines of airplanes are not designed to operate efficiently in a low power state, such as needed during the taxiing operation, such maneuvering of the aircraft consumes a lot of fuel. Also the main engines produce noise that increases the overall noise emission at an airport.

Alternatively, special vehicles, such as aviation tugs or pushers, may be used to drag or push airplanes for moving on the ground. However, since such special vehicles are expensive themselves as well as the employment thereof has to be paid for, and such vehicles are not available in large numbers at most airports, they are commonly only used for short distances, e.g. for the push-back operation from a gate. Thus, up to now, the main engines are still used for most of the taxiing, which causes above described disadvantages.

Solutions for taxiing of aircraft are already known. For instance, DE 10 2008 006 295 A1 discloses an electric motor mounted onto a running gear leg of an aircraft. The electric motor comprises a motor shaft parallel to the axle of the ground wheels of the running gear. The motor shaft can be moved axially to engage/disengage with the wheel structure of the aircraft running gear.

WO 2009/086804 A1 discloses a motor for driving the wheels of an airplane landing gear, particularly a nose landing gear, which is disposed in the base of the landing gear strut or is installed as a wheel hub motor in the wheel hub or rim. In order to eliminate a heavy and complex transmission between the motor and the wheel, the motor is configured as a hydraulic motor or electric motor and sup-plied with energy via the landing gear strut.

WO 95/29094 shows a system for driving the landing gear of an aircraft, in which both wheels of a nose gear are drivable through a differential gear assembly or, alternatively, at least one wheel of each main landing gear assembly is driven by an electric or hydraulic motor powered by the auxiliary power unit (APU) of the aircraft.

Although improvements could be achieved with the aforementioned approaches, it has been found that—especially for large commercial aircraft—these approaches did not yield satisfying results in terms of providing the necessary power to drive the aircraft without the help of the main engines. A particular aspect concerns to efficiently use the highly limited space available in the proximity of the ground wheels at the undercarriage of an airplane for such drives.

Several locations for installation of a drive unit to one or more ground wheels of the undercarriage of an airplane—also called running or landing gear—have been investigated. Basically, a drive unit may be installed at a mounting location inside or outside with respect to the undercarriage, i.e. seen by an observer from the undercarriage, of a respective ground wheel. The inside mounting location is preferable in terms of transmitting mechanical forces into the undercarriage and for establishing the required electrical, mechanical and any other connections. However, the integration of the drive unit at the inside mounting location is complex due to the very limited space. This particularly applies in cases where a brake unit is to be provided. The outside mounting location is preferable with regard to the space requirement. However, airplanes (e.g. airplanes used on short routes) are often equipped with a brake fan at the outboard mounting location, wherein as brake fan a blower unit or exhauster unit may be used, which produces an air flow for cooling the brake unit associated to the respective ground wheel. The brake fan is mandatory and may not be removed. In smaller aircraft having only one wheel associated with the leg of the undercarriage, the brake fan may also be installed on the same side as the brake unit, as e.g. shown in U.S. Pat. No. 6,615,958 B1.

Finally, yet importantly, the drive unit associated to one or more ground wheels itself needs active cooling, since such drive unit comprises a high power density required for moving the airplane by supplying torque to the associated ground wheel. Preferably, cooling of the drive unit is performed by air to avoid in-tegration of a cooling system using fluids such as water or any other coolant. That is to say, the brake unit and the drive unit both require air cooling. However, the exhausted hot air from the brake unit already has high temperature and thus, may not be used to cool the drive unit. Further the hot air from the brake unit is contaminated with brake dust may impair the drive unit when entering it.

BRIEF SUMMARY

One objective of the present invention may be to provide a drive unit for at least on wheel of an aircraft running gear that is able to supply the necessary power for taxiing large commercial aircraft, such as common passenger aircraft, while imposing minimal space requirements to the overall design of the running gear.

Another, or further, objective of the present invention may be to provide sufficient cooling to a brake unit, as well as to a drive unit as set out above, when installed at a common ground wheel.

One or all of the above problems is/are alleviated or solved by the features of the independent claims. Further embodiments and developments are defined by the respective dependent claims.

According to the invention, a drive unit for an aircraft ground wheel is associated with a brake unit for braking the ground wheel that can be rotatably mounted to an undercarriage of an airplane. The drive unit comprises a driving motor, which is drivingly coupleable to the ground wheel so that the airplane can be moved by means of the ground wheel. The drive unit further comprises a cooling system.

The cooling system includes at least a drive cooling unit. The drive cooling unit is configured to generate a drive cooling air stream for cooling the drive unit. The cooling system also includes a brake cooling unit configured to cool the brake unit. The brake cooling unit may be configured to generate a brake cooling air stream for cooling the brake unit by sucking in air from the brake unit. Particularly, the cooling system, including the brake cooling unit, may be integrated into the drive unit.

Accordingly, one general idea of the solution proposed here is to integrate a cooling unit into a drive unit for at least one ground wheel of an aircraft undercarriage or running gear, which cooling unit is configured for cooling a brake unit of the ground wheel that is arranged in the proximity of the drive unit. Such brake cooling unit may be part of a cooling system integrated into the drive unit which also is able to dissipate heat generated by the drive unit in operation, i.e. in a propulsion mode of operation of the drive unit.

In certain embodiments, the driving motor of the drive unit may be drivingly coupleable as a common cooling system drive to the cooling system for driving the respective cooling units. It is also possible that the driving motor of the drive unit is drivingly coupleable as a respective cooling unit drive to one of the brake cooling unit or the drive cooling unit. Alternatively, the brake cooling unit and/or the drive cooling unit may comprise a respective motor drivingly coupleable to the respective cooling unit.

The brake cooling unit and/or the drive cooling unit may be drivingly couple-able, directly or indirectly via a respective gearing structure, to its respective drive, e.g. the driving motor of the drive unit. Such a gearing structure can be implemented by means of a transmission gear in form of a planetary gearing or the like.

As mentioned above, the brake cooling unit may be configured to generate the brake cooling air stream by sucking in air from the brake unit. For instance, the brake cooling unit integrated in the drive unit, being installed on one side of the ground wheel, may be arranged to suck off air surrounding the brake unit, being installed on the other side of the ground wheel, through the ground wheel.

For instance, there may be provided one or more openings in a wheel disk of the ground wheel or spaces between spokes of the ground wheel may serve as openings through which air from the brake unit can be sucked off or exhausted.

The drive unit may further comprise an air guidance for guiding drive cooling air and an air shroud for separating the drive cooling air stream from the brake cooling air stream in particular areas.

The air guidance may be arranged such that the generated drive cooling air is guided through and/or around components of the drive unit which generate heat in operation of the drive unit, in particular during operation of the drive unit in a propulsion mode.

The air shroud may be configured to reduce or suppress mixing of the relatively hot brake cooling air stream exhausted from the brake unit with the drive cooling air stream that comes downstream of the drive unit. In particular the air shroud may be configured to reduce or suppress mixing of the relatively hot drive cooling air stream with the air flow in the area upstream to the drive of the brake cooling unit. Therefore, by means of the air shroud the efficiency of the brake cooling unit is not hampered by sucking in exhausted air from the drive cooling unit. Thus, it is ensured that the complete performance of the brake cooling unit is applied to suck in the hot brake cooling air and is not impaired by the exhaust drive cooling air of the drive unit.

For instance, in certain embodiments the air shroud can be configured to guide the drive cooling air stream downstream of the brake unit in a way as to suppress mixing of the brake cooling air with the drive cooling air stream at a position upstream of the drive of the brake cooling unit.

In one further development, the cooling system may further include a venturi section. The venturi section may contribute to, or even provide for, the function of the brake cooling unit, i.e. may be a means for generating the brake cooling air stream. It has been found, that the venturi section can be employed to generate, by means of the drive cooling air stream as a blowing air stream, a low enough pressure for sucking in the brake cooling air stream as a sucked air stream. In other words, the venturi section may be used as means for generating the brake cooling air stream and itself may be driven by the drive cooling air stream.

Alternatively, the venturi section of the air shroud may contribute to, or even provide for, the function of the drive cooling unit, i.e. as means for generating the drive cooling air stream. Accordingly, the venturi section may be employed to generate a low enough pressure for sucking in, by means of the brake cooling air stream as a blowing air stream, the drive cooling air stream as a sucked air stream. In other words, the venturi section may be used as means for generating the drive cooling air stream and itself may be driven by the brake cooling air stream.

The venturi section may particularly comprise a pressure inlet, a suction inlet and an exhaust. Thus, the pressure inlet can be connected to the blowing air stream such that the sucked air stream is generated at the suction inlet. The blowing air stream and the sucked air stream together leave the venturi section at the exhaust.

Particularly, the air shroud may include the venturi section. The air shroud can be arranged around or in the periphery of the drive unit relative to an axis of rotation of the ground wheel. For instance, the air shroud may be arranged in an essentially cylindrical manner, i.e. having a ring shaped cross-section. For example the air shroud may be a double-walled, pipe shaped air guiding duct. Instead of a total ring shaped cross-section, the air shroud may merely comprise respective cylinder sections of such ring shaped air guiding duct. The air shroud may also be comprise of one or more air guiding ducts arranged in an circumferential manner, i.e., on predetermined radial locations (relative to the axis of rotation of the ground wheel) of the drive unit as respective air guiding systems, e.g. in form of pipes, which each comprise a respective venturi section in form of a respective venturi tube.

By means of the venturi section the brake cooling unit or the drive cooling unit can be implemented without the need to provide for a generation unit for a cooling air stream separately for each cooling unit. The complexity of the whole arrangement can be reduced due to the fact that only one generation unit for a cooling air stream is required.

In certain embodiments, at least one cooling unit may be implemented by a radial or axial blower or exhauster.

In certain embodiments the driving motor of the drive unit may be implemented by an electric motor or a hydraulic motor. In a propulsion mode of operation, the driving motor may drive an input gear of a driving gearing structure. The driving gearing structure may be drivingly coupleable at an output gear via an operable clutch which can engage and disengage with the ground wheel, e.g. via a respective coupling gear, which can be arranged at the rim or disk of the wheel.

In particular embodiments the driving motor of the drive unit may bear-ranged in the drive unit coaxially with respect to an axle of the undercarriage to which the ground wheel is mounted. In particular embodiments, the driving motor may have the configuration of a wheel hub motor.

In certain embodiments, in which the cooling system is driven by the driving motor of the drive unit, the cooling performance of the cooling system, i.e. the amount of cooling air for the drive unit produced by the cooling system, will be fixedly linked to the rotational speed of the driving motor of the drive unit. As a result, during operation of the drive unit in the propulsion mode, i.e. when the drive unit has to deliver torque to the ground wheel and hence inside the drive unit heat is produced which needs to be dissipated. However, the integrated cooling system will be running at a low speed corresponding to the rotational speed of the ground wheel. This will result in low cooling performance and increase in temperature of the components of the drive unit as well as the disk and rim of the ground wheel.

Accordingly, a further aspect of the present invention relates to a method of controlling such drive unit, in order to overcome the afore-mentioned problem of increase in temperature in the drive unit at low rotational speed of the drive unit.

To overcome such problem of increase in temperature, the present invention proposes a method of controlling a drive unit that comprises the following steps:

When an operating condition of the ground wheel, i.e. the running gear, is shifted from a propulsion mode of operation to a non-propulsion mode of operation, the drive unit is decoupled immediately from the ground wheel.

In the propulsion mode of operation, torque is to be delivered by the drive unit to the ground wheel in order to move the airplane by means of the drive unit.

In the non-propulsion mode of operation no torque is to be delivered by the drive unit to the airplane wheel. The non-propulsion mode of operation may include: a so-called coast mode, in which the airplane is coasting, i.e. moving without being driven by the drive unit, but only due to its own inertia, or a deceleration mode, in which the airplane is decelerated by activation or application of the brake unit(s), or at a standstill of the airplane, e.g. when the airplane is parking or stopping during taxiing.

After switching the ground wheel from the propulsion mode into the non-propulsion mode, the rotational speed of the drive unit is significantly increased and thus the rotational speed of the drive cooling unit fixedly coupled thereto is increased correspondingly. As a result, the amount of drive cooling air generated by the cooling system is increased.

Particularly, when the operating condition of the ground wheel is shifted from the non-propulsion mode to the propulsion mode, the rotational speed of the drive unit may be synchronized immediately with the actual speed of the ground wheel; and the drive unit may be coupled with the ground wheel for driving the ground wheel.

According to the method suggested herein, the overall thermal capacity of the drive unit, and optionally also the thermal capacity of the wheel, is used to accumulate heat generated by the driving motor of the driving unit in operation. The inventor recognized that such heat is generated essentially only during the propulsion mode. Therefore, it is suggested that, as soon as the operating condition is changed from the propulsion mode to the non-propulsion mode, the cooling system of the drive unit be operated with maximal cooling performance, in or-der to dissipate heat accumulated in the components of the drive unit and/or of the wheel. The suggested method makes an efficient use of the components of the drive unit and/or of the wheel as a temporary thermal buffer (according to their capacity of heat), which thermal buffer may be repeatedly filled/depleted, in order to keep temperature below critical levels.

A further aspect of the present invention relates to an aircraft undercarriage comprising at least one wheel axle supporting at least one wheel, a brake unit associated to the at least one ground wheel, and at least one drive unit also associated with the at least one wheel according to the present invention.

The aircraft undercarriage may further comprise or may be operationally connected, to a control unit which is configured to carry out a control method as described herein above.

In certain embodiments of the aircraft undercarriage, the ground wheel may comprise a rim for installation or receiving a tire. The rim may be connected to a disk by which the ground wheel is connectable to a hub which is rotatably mounted on the at least one axle of the aircraft undercarriage. The disk and the rim form, with respect to the undercarriage, an inside cup-like space and an outside cup-like space, respectively. Both spaces are separated from each other by the disk which forms the bottom of the respective cup-like spaces. The drive unit may be configured such as to be removably connectable with the axle in the outside cup-like space. The brake unit associated with the ground wheel of the undercarriage may be installed in the inside cup-like space.

In certain embodiments, the drive unit, in particular the outside shape thereof, may be configured in such a way that in a situation where the drive unit is mounted to, or installed at, the ground wheel, a predefined gap is formed in the out-side cup-like space between the rim and the drive unit, e.g. between the rim and a casing of the drive unit. In the so formed gap the brake cooling air stream and the drive cooling air stream can be blown out off the outside cup-like space.

Particularly, the aircraft undercarriage according to the present invention may be used as a main running gear or landing gear of an airplane.

Objects and features of the invention will become apparent from the following detailed description considered in conjunction with the accompanying drawings. It is to be understood, however, that the drawings are designed solely for purposes of illustration and not as a definition of the limits of the invention, for which reference should be made to the appending claims only. It should be further understood that the drawings are merely intended to conceptually illustrate the structures and the procedures described herein.

BRIEF DESCRIPTION OF THE DRAWINGS

The invention is now described in more detail below with regard to the exemplary embodiments shown in the accompanying drawings, in which.

DETAILED DESCRIPTION OF PREFERRED EMBODIMENTS

Figure 1:
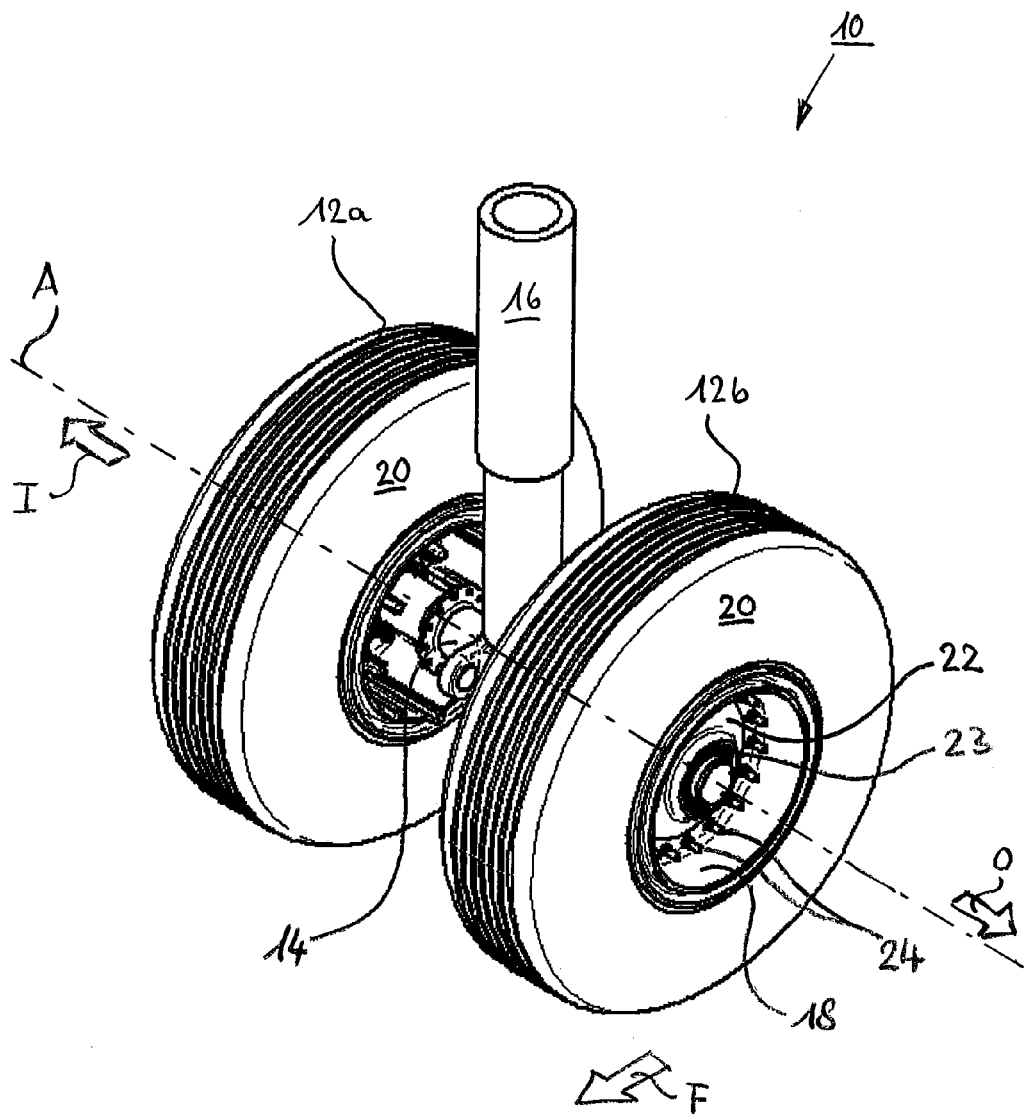
FIG. 1 shows a three-dimensional representation of an aircraft undercarriage according to one aspect of the invention.

FIG. 1 shows a three-dimensional representation of an undercarriage 10—also known as landing or running gear—of an airplane (not shown) according to one aspect of the present invention.

Figure 2:
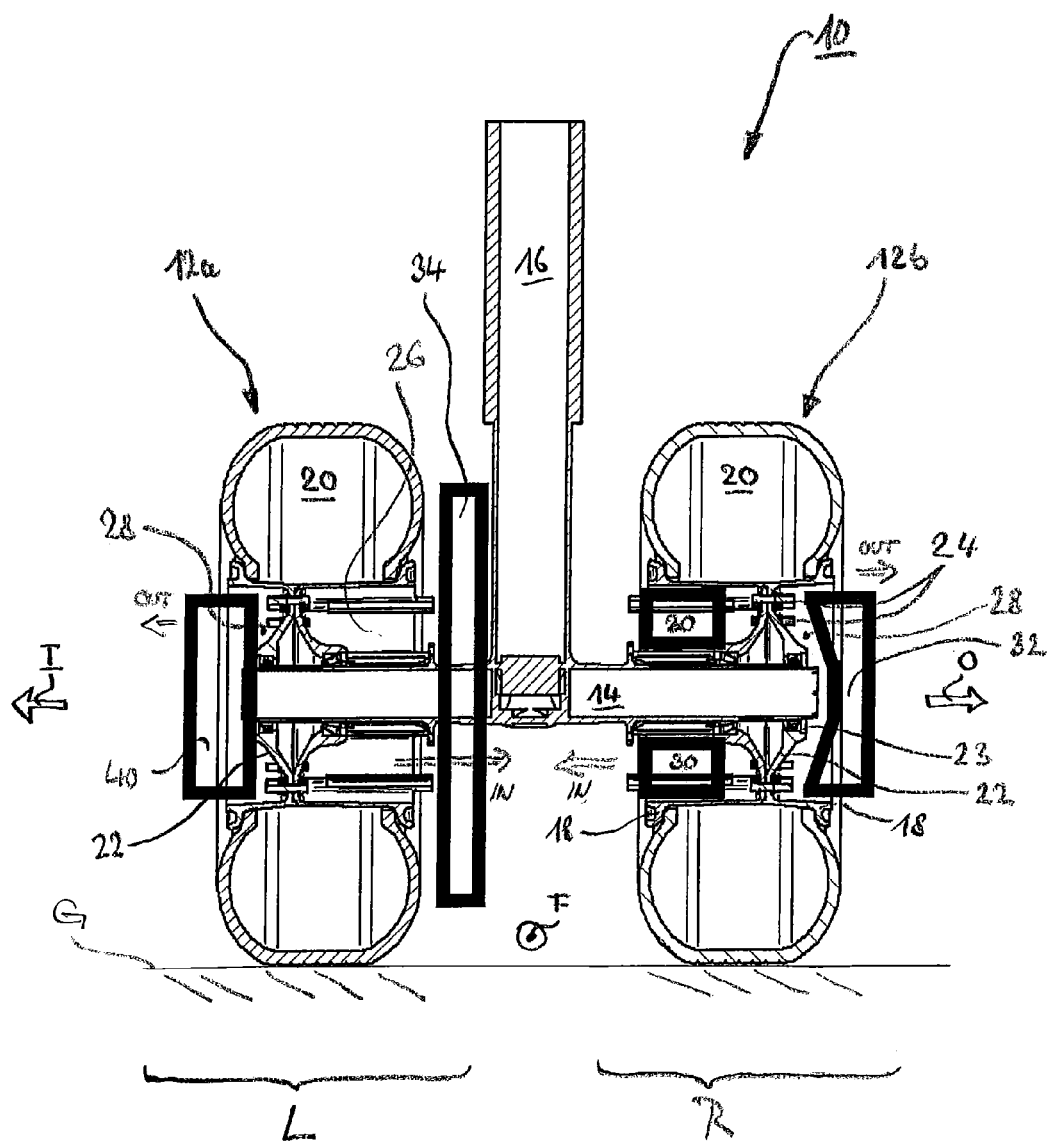
FIG. 2 shows a cross-sectional view through the aircraft undercarriage of the FIG. 1.

The undercarriage 10 comprises a first ground wheel 12a and a second ground wheel 12b, which are rotatably mounted on an axle 14 of the undercarriage 10. The undercarriage 10 further comprises a leg formed by a strut 16 as the major mechanical element for transferring the weight and other loads during landing, taxiing and take-off of the airplane via the undercarriage and the ground wheels attached thereto into the ground G (FIG. 2).

Further each of the ground wheels 12a, 12b comprises a rim 18 for installation or receiving of a respective tire 20. The rim 18 is further connected to a disk 22 which is attached to a hub 23 in any suitable manner that allows for a rotatable fixed attachment between the ground wheel and the axle 14 of the undercarriage 10.

The rim 18 and the disk 22 may be made of one piece, respectively, but usually these elements of a wheel are made of respective separate parts which are interconnected by securing bolts 24. However, in the context of the present invention the particular construction of a wheel is not essential.

For more details regarding the structural details of an airplane undercarriage reference is made to Bender et al., *Aerospace Engineering*, Vol. 16, No. 3, pp. 13-16, March 1996, ISSN: 07362536, titled "Landing Gear Structural Integrity".

For purpose of reference it is assumed that in a situation where the undercarriage 10 of FIG. 1 is mounted to an airplane (not shown), the forward direction of motion is represented by the arrow with reference sign F. Further it is assumed, that the undercarriage 10 shown in FIG. 1 is part of a main running or landing gear of the airplane, so that the first wheel 12a sits closer to the fuselage of the airplane, i.e. "inboard" with respect to the airplane; the inboard direction is indicated by an arrow with reference sign I. Accordingly, the second wheel 12b is located on the axle 14 in an "outboard" direction with respect to the fuselage of the airplane, which direction is indicated by arrow with reference sign 0.

The main mechanical interconnection between the axle and the internal structure of the airplane, i.e. the strut 16 is also known as running gear leg of the undercarriage 10.

FIG. 2 shows a cross-sectional view through the aircraft undercarriage of FIG. 1 and in a schematic manner illustrates, in connection with a respective one of the ground wheels 12a, 12b of the undercarriage 10, usual configurations for the arrangement of a brake unit and a drive unit as actuators for the respective wheel.

As already explained in connection with FIG. 1, the ground wheels 12a, 12b each comprise a respective rim 18 for installation of the tire 20 associated therewith. The rim 18 is further connected with a disk 22 by which the respective ground wheel 12a, 12b is connectable to a respective hub 23 which is rotatably mounted on the axle 14 of the undercarriage 10.

As can be seen in the cross-sectional view of FIG. 2, with each of wheels 12a and 12b both the respective rim 18 and the respective disk 22 form two parts which are fixedly mounted together by respective securing bolts 24.

The respective disk 22 and rim 18 of each wheel 12a, 12b form a cup-like installation space 26, 28 on each side of the wheels 12a, 12b. With respect to the center of the undercarriage represented by the leg or strut 16, there is an inside cup-like installation space 26 (i.e. a cup-like installation space on the side of the wheel being oriented to the undercarriage) and an outside cup-like installation space 28 (i.e. a cup-like installation space on the side of the wheel oriented away from the undercarriage). Both cup-like installation spaces 26, 28 are separated by the respective disk 22 of the respective wheel 12a and 12b, respectively. Moreover, the disk 22 of each wheel 12a, 12b forms the bottom of the respective cup-like installation spaces 26, 28.

In connection with the right wheel 12b, the usual installation locations of a brake unit 30 and a cooling system 32 are illustrated. The brake unit 30 is operationally mounted in the inside cup-like installation space 26 between the axle 14 and the rim 18. In the outside cup-like installation space 28, a so-called brake fan is usually installed as the cooling system 32 for the brake unit 30. The brake unit 30 may be implemented as a stack comprising a stack of disk-like brake pads sandwiching respective metal disks in-between.

In connection with the left wheel 12a, a drive unit 34 or actuator installed in a less commonly used installation space between the strut 16 and the wheel 12a is illustrated. Further, a possible installation space for a drive unit 40 according to the solution proposed herein, i.e. with integrated cooling system for the brake unit, is shown in the outside cup-like installation space 28 of the left wheel 12a. With a drive unit 40 located in the outside cup-like installation space 28, the corresponding brake unit 30 will be located in the inside cup-like installation space 26, in the same way as indicated by 30 in the other wheel 12b.

Figure 3:
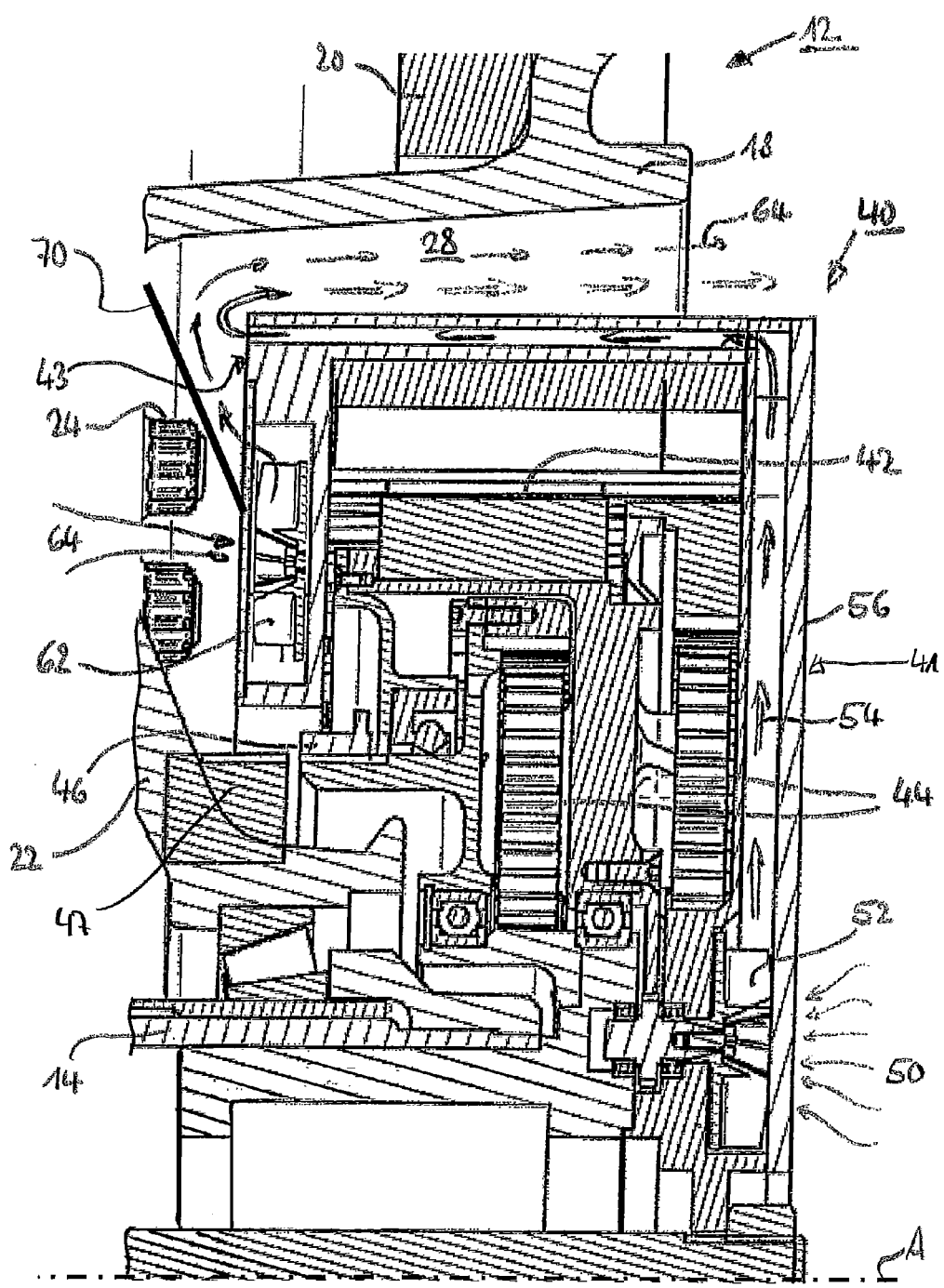
FIG. 3 shows an enlarged portion of a cross-sectional view of one ground wheel comprising a drive unit according to a first exemplary embodiment of the present invention.

FIG. 3 shows one embodiment of a drive unit 40 which is installed as an actuator to a ground wheel 12 in more detail.

The drive unit 40 comprises a driving motor 42, which may be an electric motor or a hydraulic motor. The driving motor 42 has its rotor drivingly connected to a transmission gear 44, which may be a planetary transmission gear. Torque generated by the driving motor 42, generally at high rotational speed, can be converted by the transmission gear 44 into a lower rotational speed but higher torque, and can be passed to the ground wheel 12, which is rotatably mounted to the rigid axle 14 by means of a coupling mechanism. The coupling mechanism is implemented by a clutch gear 46, which can be engaged and disengaged with a corresponding gear element 47 at the disk 22 of the wheel 12.

The drive unit 40 is provided with a cooling system for cooling the drive unit 40 as well as a brake unit proximate to the drive unit. The cooling system is implemented into the drive unit 40 and works as follows: First, fresh air 50 is sucked in via a first blower or fan 52 working as a drive cooling unit. The first blower or fan 52 is located at the front-side 41 of the drive unit 40. The front-side 41 of the drive unit is the side facing away from the disk 22 forming the bottom of the cup-like space 28. In the embodiment of FIG. 2, the drive unit 40 is installed in the outside cup-like installation space 28 of the wheel 12, and thus the front-side 41 of the drive unit 40 is located on the outboard side of the cup-like installation space 28. The sucked in fresh air 50 is compressed by the fan 52 and is guided as drive cooling air 54, between a casing 56 of the drive unit 40 and internal components thereof, around the drive unit 40 to the rear-side 43 of the drive unit 40 which is oriented opposite to the disk 22 of the wheel 12. The rear-side 43 of the drive unit 40 is facing the disk 22 forming the bottom of the cup-like installation space 28 of the wheel 12.

The shape of the drive unit 40 is adapted to the inner shape of the wheel 12, i.e. the inner dimensions of the rim 18 and the disk 22, such that when installed in the outside cup-like space 28 a gap is formed between the rim 18 and the outside casing 56 of the drive unit 40. In this gap the drive cooling air stream 54 can be blown out off the outside cup-like space 28, i.e. the heat produced by the drive unit 40 in operation is dissipated in a rate that corresponds to the amount of the drive cooling air 54 blown around the drive unit 40 and out off the cup-like installation space 28.

The fan or blower 52 for generating the drive cooling air stream 54 shown in the embodiment of FIG. 3 is directly driven by the driving motor 42 of the drive unit 40 via a gearing mechanism. Thus, the rotational speed of the fan or blower 52 is fixedly coupled to the rotational speed of the driving motor 42. As a result the actual cooling performance of the drive cooling unit is directly linked with the actual speed of the driving motor 42.

The fan or blower 52 may also be driven by its own drive, which may also be implemented by an electric motor or a hydraulic motor. In that case the cooling performance can be controlled independently of the actual operating mode of the driving motor 42.

A second fan or blower 62 is integrated on a location at the rear-side 43 of the drive unit 40, i.e. the side facing the bottom of the cup-like installation space 28. The second fan 62 is configured to suck in air surrounding a brake unit (not shown) mounted in the inside cup-like installation space 26 of the ground wheel 12 (in FIG. 3 on the left-hand side of the disk 22). The second fan 62 functions as a exhauster and sucks in hot air generated by the brake unit in operation thereof as a brake cooling air stream 64 through respective openings in the disk 22 of the wheel 12 and blows the brake cooling air stream 64 together with the drive cooling air stream 54 through the gap between the drive unit 40 in the outside cup-like installation space 28 and the rim 18 out off the wheel 12.

As a further development and improvement, in FIG. 3 an air shroud 70 is in-stalled in the outside cup-like installation space 28 between the rear-side 43 of the drive unit 40 and the disk 22 forming the bottom of the outside cup-like installation space 28. Such air shroud 70 is configured to prevent the brake cooling air stream 64 in an area upstream to the second fan 62 from being mixing with the drive cooling air stream 54 downstream of the drive cooling unit at a position upstream of components that generate heat. Thereby, the sucked in brake cooling air 64 is separated from the drive cooling air 54 and thus the efficiency of cooling provided by the brake cooling unit 64 is not reduced by the drive cooling air stream. In other words, the drive cooling air 54 is prevented from being sucked into the brake cooling unit 62. This helps improving the efficiency of the brake cooling unit 62 integrated into the drive unit 40.

Figure 4:
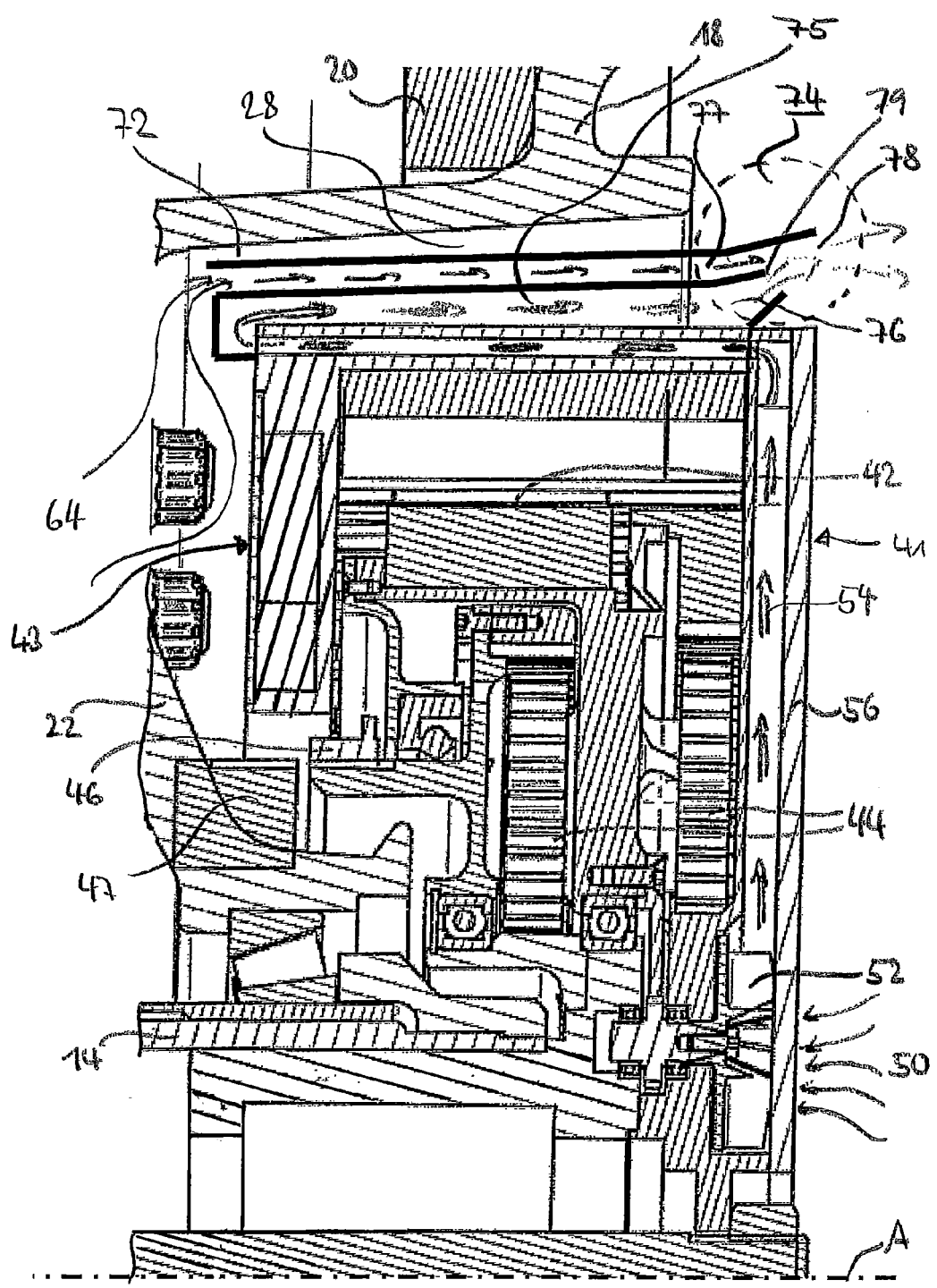
FIG. 4 shows a further enlarged portion of a cross-sectional view of one ground wheel comprising a drive unit according to further development of the exemplary embodiment in FIG. 3.

FIG. 4 shows a further enlarged portion of a cross-sectional view of the ground wheel 12, for illustration of a further development of the drive unit 40 according to the exemplary embodiment in FIG. 3. Since the construction of the drive unit 40 shown in FIG. 4 is basically identical to the construction described in connection with FIG. 3, the same elements or parts are referenced with the same reference signs. Further, for sake of clarity and conciseness, only the relevant distinguishing amendments with respect to the further development are described in the following with more detail. It is referred to the description of FIG. 3 for any other details of the construction.

Again, the fan or blower 52 works as a drive cooling unit and generates a drive cooling air stream 54 by sucking in fresh air from the front side 41 of the drive unit 40 which is installed in the outside cup-like installation space 28 of the wheel 12. The front side 41 of the drive unit faces away from the bottom of the cup-like installation space 28, i.e. it is oriented towards the outside of the wheel 12. The sucked in fresh air 50 is compressed and blown as the drive cooling air stream 54 between the outside casing 56 of the drive unit 40 around internal components of the drive unit 40 which generate heat in operation and towards the rear-side 43 thereof. The rear side 43 of the drive unit is facing the bottom of the cup-like installation space 28. After taking up heat generated in the drive unit 40, the drive cooling air stream 54 enters a modified air shroud 72 according to the further development which forms an air guiding passage 75 arranged in a circumferential manner proximate to the drive unit 40 and leading the drive cooling air stream 54 substantially parallel to the outside casing 56 of the drive unit 40 into the outside direction of the outside cup-like installation space 28, i.e. away from the bottom of the cup-like installation space 28. The air shroud 72 is arranged in the periphery of the drive unit 40 relative to an axis A of rotation of the wheel 12. Thus, the air guiding passage 75 of the air shroud 72 has an essentially cylindrical or ring shaped cross-section. For example, the air shroud 72 may be a double-walled pipe-like air guiding duct, in which the air guiding passage 75 is formed between an inner wall and the outer surface of the outside casing 56 of the drive unit 40. It is noted that instead of a complete ring shaped cross-section, the air shroud 72 may merely comprise respective cylinder sections of such ring shaped air guiding duct system. The air shroud 72 may also be comprise of one or more air guiding ducts arranged in an circumferential manner, i.e. on predetermined radial locations (relative to the axis A of rotation of the wheel 12) of the drive unit 40 as respective air guiding systems, e.g. in form of one or more pipes.

The modified air shroud 72 further comprises a venturi section 74 formed by a pressure inlet 76, a suction inlet 77 and an exhaust 78. The drive cooling air stream 54 is connected as a blowing air stream to the pressure inlet 76 of the venturi section 74 and is relaxed after passing the throat 79 of the venturi section thereby generating a low pressure at the suction inlet 77.

The venturi section 74 may be implemented as a venturi nozzle or venturi tube. Several venturi nozzles or venturi tubes may be arranged circumferentially around the drive unit 40 in the outside cup-like installation space 28. For example, such venturi nozzles or venturi tubes may be formed coaxially in a cylindrical manner in the periphery of the drive unit 40. Alternatively, the venturi nozzles or tubes may be arranged in the form of circle sections around the drive unit 40, i.e. arranged in the circumference thereof.

According to the further development the venturi section 74 is employed as the brake cooling unit, as it generates the brake cooling air stream 64 by means of the suction inlet 77 of the venturi section 74. The suction inlet 77 is connected to a tube-like air guide which has an opening or several openings close to the bot-tom of the cup-like installation space 28, i.e. in the embodiment shown close to the wheel disk 22 where corresponding openings are provided through which hot air generated in operation of the brake unit on the other side of the wheel disk 22 may be sucked in for cooling of the brake unit. The venturi section 74 further comprises a common exhaust 78 through which the drive cooling air stream 54 and the brake cooling air stream 64 are commonly blown out off the outside cup-like installation space 28.

Though not shown in detail, the principle according to the further development of the present invention illustrated in FIG. 4 can be also implemented such that the first fan or blower 52 used as drive cooling unit is omitted and instead the second fan or blower 62 as shown in FIG. 3, used as a brake cooling unit, is present. Basically, an air shroud with the configuration as the air shroud 72 in the embodiment shown in FIG. 4 may be used, except for the venturi section 74. The venturi section 74 needs to be adapted such that the brake cooling air stream 64 is used as a blowing air stream for generating a low pressure at the suction inlet of the venturi section 74. The drive cooling air stream 54 is then connected to the suction inlet of the venturi section 74.

Accordingly, in this alternative embodiment by means of passing the brake cooling air stream 64 via the venturi section 74, the drive cooling air stream 54 can be generated by sucking in fresh air in the area of the no longer present first fan or blower 52 at the front-side 41 of the drive unit 40. Thus, the venturi section 74 may be considered as being employed as the drive cooling unit. The sucked in fresh air 50 is again guided through the air guidance around internal components of the drive unit 40 which generate heat in operation, and so the heat is carried away by means of the drive cooling air stream 54, as in the embodiment in FIG. 3 or 4.

The present invention has been described by way of the exemplary embodiments shown in FIGS. 3 and 4, according to which the brake unit associated with a ground wheel is installed in the inside cup-like installation space 26 (i.e. the cup-like installation space on the side of the wheel being oriented to the undercarriage) and the drive unit 40 is installed in the outside cup-like installation space 28 (i.e. a cup-like installation space on the side of the wheel oriented away from the undercarriage). However, it is nevertheless possible to have the drive unit 40 in-stalled in the inside cup-like installation space 26 and the brake unit in the out-side cup-like installation space 28.

Figure 5:
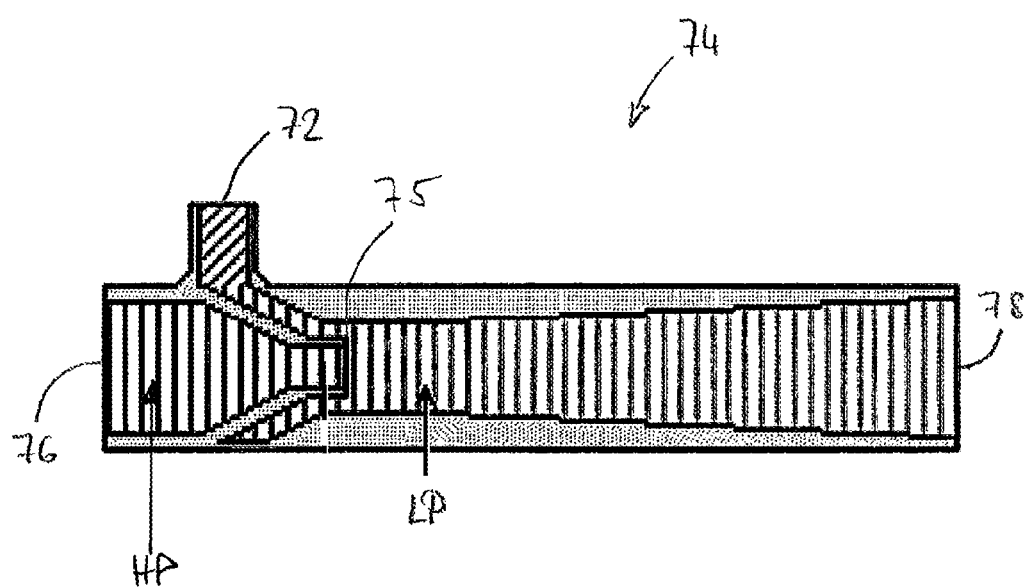
FIG. 5 illustrates the functional principle of the venturi section as employed in the further development in FIG. 4.

FIG. 5 illustrates the functional principle of the venturi section 74 used in the further development of the present invention shown in FIG. 4.

Basically, a venturi nozzle is a throttle device in which blowing air stream is connected to a pressure inlet 76 of the venturi section 74. Such blowing air stream may be one of the generated cooling air streams, the drive cooling air stream 54 generated by the first fan or blower 52 or, alternatively, the brake cooling air stream 64 generated by the second fan or blower 62. By action of the fan, the blowing air stream is slightly compressed with respect to the atmospheric pressure, e.g. is compressed about a ratio of 1.3 to 1 (i.e. about 0.3 bar more than atmospheric pressure) or more. When passing the throat 75 of the venturi section 74, the blowing air stream with the high pressure HP is relaxed inside the venture system 74 thereby generating a low pressure LP at the suction inlet 72 of the venturi system.

The inventor has found that, by this arrangement, a sufficiently low pressure LP can be generated at the suction inlet 72 to be used as a cooling unit for generating the second required cooling air stream, i.e. the brake cooling air stream 64 according to the embodiment shown in FIG. 4 or the drive cooling air stream 54 (not shown explicitly). Calculations and simulations have shown that the ratio of the air streams required for cooling the brake unit, on the one hand, as well as for cooling the drive unit 40, on the other hand, comprise dimensions which can be realized in the context of a ground wheel of an airplane undercarriage according to the invention. Finally, the venturi system or section 74 comprises a common exhaust 78 from which both, the cooling air streams for the brake unit as well as for the drive unit, are blown out.

With respect to one particular aspect of the present invention, a dedicated method for controlling the drive unit 40 will be discussed. As described above, the one or two fans or blowers 52, 62 may be driven, directly or indirectly, by means of the driving motor 42 of the drive unit 40. Accordingly, the rotational speed of the cooling unit or cooling units generating the required cooling air streams is de-pendant fixedly to the actual rotational speed of the driving motor 42. In the propulsion mode of the driving motor 42, the torque generated by the driving motor 42 is transferred via the engaged clutch 46 to the wheel 12, for example when the airplane moves during taxiing. High power density is required for the driving motor 42, in order to enable the drive unit 30 to generate a sufficiently large torque at the output stage. Generating the required torque causes generation of a high level of heat inside the drive unit 40. Most heat is generated during the propulsion mode. However, due to the fixed coupling of the rotational speed of the cooling unit 52 required for cooling the drive unit 40, there is a risk that the rotational speed of the driving motor 42 is not large enough to generate a sufficiently large cooling air for dissipating the generated heat. When an electric motor is operated at low rotational speeds and high torque, the most amount of heat to be dissipated is generated by such motor. This particularly applies when the driving motor 42 of the drive unit 40 operates in the propulsion mode in order to drive the airplane, and the propulsion speed of the airplane is low. In particular, when the drive unit 40 according to the invention is employed as a so-called green taxiing system for an airplane, the drive unit often is used in a so-called stop-and-go operation. Accordingly, in the propulsion mode not enough cooling air is generated by the cooling system comprising the drive cooling unit driven by the electric motor 42 of the drive unit.

For solving this problem, according to a further aspect of the invention a method for controlling the drive unit is proposed. The method for controlling the drive unit according to the invention provides an improved control strategy to ensure the required cooling of the drive unit.

In this context it is advantageous to detect whether the ground wheel 12 is to be operated in the propulsion mode or whether the ground wheel 12 is to be operated in the non-propulsion mode.

In the propulsion mode, the airplane is moved by means of torque produced by the drive unit 40 and delivered to the ground wheel 12. Hence, in the propulsion mode, the drive unit 40 is to be operated in the propulsion mode, in particular.

In the non-propulsion mode, torque generated by the drive unit 40 is not required for moving the airplane. Rather, in the non-propulsion mode the airplane may still move without any torque being provided to the ground wheel 12 by the drive unit 40. Typically, the airplane is coasting when it moves without propulsion but due to the inertia of its own movement after having been propelled by the drive unit 40. The airplane may also be propelled in other way than by the drive unit 40 when coasting (e.g. being propelled by the main engines without any support from the drive unit 40). The airplane is also regarded as being in the non-propulsion mode when being decelerated, i.e. braked by application of the brakes, or when stopped, i.e. during standstill. That is to say, the airplane is also considered as being in the non-propulsion mode, when being in a park position or when stopping during taxiing. In other words, any phases of operation where the drive unit 40 is not required to deliver any torque to the ground wheel 12 may be considered as the non-propulsion mode.

Typically in an airplane having drive units 40 installed in ground wheels 12 of the undercarriage employed as landing gear of the airplane, such landing gears are used as a main landing gear of the airplane. For such landing gears a control system is present via which input commands of the pilot of the airplane are available to detect whether the ground wheel, and correspondingly the drive unit associated with it, is to be operated in the propulsion mode or in the non-propulsion mode.

According to the method proposed here, as soon as the control system detects, that the propulsion mode of ground wheel 12 and/or the drive unit 40 is not required, the drive unit 40 may be operated in the non-propulsion mode where torque produced by the driving motor 42 is not transferred to the ground wheel 12. When switching to the non-propulsion mode, the control system of the drive unit 40 controls the clutch 46 of the drive unit 40 so that the driving motor 42 of the drive unit 40 is no longer drivingly coupled to the wheel 12. After such decoupling operation has been effected, there is no need for the rotational speed of the driving motor 42 to be synchronized with the actual rotational speed of the ground wheel 12.

The invention proposes that the driving motor 42 of the drive unit 40 be immediately controlled such that its rotational speed is increased to a much higher level, as soon as the decoupling operation has been effected. Thereby, also the fan or blower(s) 52 and/or 62, used as cooling units, which are directly driven by the driving motor 42 are also accelerated correspondingly. This results in generation of much more cooling air for the drive unit 40, as well as for the brake unit 30. Since not much torque is generated by the driving motor 42 when running at high rotational speeds but with low torque load, in the non-propulsion mode of the drive unit 40 less heat to be dissipated is generated but much cooling air is generated.

As a result, heat generated during the propulsion mode of the ground wheel 12 or drive unit 40 mainly is taken up by the components of the drive unit 40 and other components of the ground wheel/landing gear adjacent thereto. Such heat is accumulated by the thermal capacity of the whole arrangement. During operation of the ground wheel/drive unit in the non-propulsion mode, such heat is dissipated by the cooling system running with maximum performance.

As soon as operation of the ground wheel/drive unit in the propulsion mode is required again, e.g. in order to move the airplane during taxiing, the proposed control strategy immediately controls the rotational speed of the driving motor 42 in such a way to synchronize it with the actual speed of the ground wheel 12. As soon as the rotational speed of the driving motor 42 is synchronized with the ground wheel 12, the control system controls the clutch 46 to be engaged with the ground wheel 12, such that the drive unit 40 is again coupled to the ground wheel 12 of the undercarriage. In such situation, the ground wheel 12 can be driven with the desired torque and the drive unit 40/ground wheel 12 operate in the propulsion mode.

With drive units 40 using permanently excited electric motors, the proposed control strategy and method can be implemented such that switching from the propulsion mode to the non-propulsion mode and vice versa can be affected within fractions of seconds. Hence, the control process involved with switching from the propulsion mode to the non-propulsion mode and vice versa is likely not realizable by the pilot or passengers of the airplane as an uncomfortable feed-back in handling of the airplane.

Finally, a drive unit 40 for an aircraft ground wheel 12 associated with a brake unit 30 for braking the ground wheel 12 has been disclosed, the drive unit 40 comprising a driving motor 42 being drivingly coupleable to the ground wheel 12; and a cooling system including at least a drive cooling unit 52 being con-figured to generate a drive cooling air stream 54 for cooling the drive unit 40 and a brake cooling unit 62, 70 or 72, 74 configured to generate a brake cooling air stream 64 by sucking in air from the brake unit 30. Further a method of con-trolling such drive unit 40 has been disclosed in which the cooling system is driven by the driving motor 42 of the drive unit 40, the method comprising decoupling the driving motor 42 from the ground wheel 12 and increasing the rotational speed of the driving motor 42 to increase the amount of generated drive cooling air 54, when an operating condition of the ground wheel 12 and/or of the drive unit 40 is switched from a propulsion mode to a non-propulsion mode.

By the present invention the thermal capacity or heat capacity of the drive unit 40 and adjacent components is employed for storing heat generated in the driving motor 42 during the propulsion mode. Such stored heat is dissipated during the non-propulsion mode of the ground wheel 12, when the integrated cooling system can be operated with maximum performance. The drive unit 40 according to the present invention also provides the advantage that cooling of the drive unit 40 during stand-still of the airplane, for instance when the airplane is parked in its parking position or when the airplane is stopped during taxiing, is possible without any restrictions.

The invention claimed is:

1. A drive unit (40) for an aircraft ground wheel (12) associated with a brake unit (30) for braking the ground wheel (12), the drive unit (40) comprising:
    a driving motor (42) being drivingly coupleable to the ground wheel (12); and
    a cooling system including at least a drive cooling unit (52) being configured to generate a drive cooling air stream (54) for cooling the drive unit (40) and a brake cooling unit (62, 70; 72, 74) configured to generate a brake cooling air stream (64) by sucking in air from the brake unit (30) to supply the brake cooling unit (72, 74),
    wherein the cooling system further includes a venturi section (74), the venturi section (74) being configured either to generate a low pressure (LP) for sucking in the brake cooling air stream (64) as a sucked air stream by means of the drive cooling air stream (54) as a blowing air stream, or to generate the low pressure (LP) for sucking in the drive cooling air stream (54) as the sucked air stream by means of the brake cooling air stream (64) as the blowing air stream.

2. The drive unit (40) according to claim 1, wherein the driving motor (42) of the drive unit (40) is drivingly coupleable as a common cooling system drive to the cooling system or as a respective cooling unit drive to one of the brake cooling unit (62) or the drive cooling unit (52).

3. The drive unit (40) according to claim 1, further comprising:
    an air guidance for guiding the drive cooling air stream (54); and
    an air shroud (70; 72);
    wherein the air guidance is arranged such that the drive cooling air stream (54) is guided through or around components of the drive unit (40) which generate heat in operation of the drive unit (40), and
    wherein the air shroud (76; 72) is configured to suppress mixing of the drive cooling air stream (54) upstream of components of the drive unit (40) which generate heat with the brake cooling air stream downstream to the brake cooling unit.

4. The drive unit according to claim 3, wherein an air shroud (72) includes the venturi section (74).

5. The drive unit (40) according to claim 1, wherein the venturi section (74) comprises a pressure inlet (76), a suction inlet (77), and an exhaust (78), the pressure inlet (76) being connected to the blowing air stream (54) such that the sucked air stream (64) is generated at the suction inlet (77), and the blowing air stream and the sucked air stream leave the venturi section at the exhaust (78).

6. The drive unit (40) according to claim 1, wherein at least one of the drive cooling unit or the brake cooling unit (52, 62) comprises anyone of: a radial blower, an axial blower and exhauster.

7. The drive unit (40) according to claim 1, wherein the driving motor (42) in operation drives an input gear of a driving gearing structure (44), the driving gearing structure (44) including an output gear being drivingly coupleable via a clutch (46) to a wheel gear (47) of the ground wheel (12).

8. The drive unit (40) according to claim 1, wherein the driving motor (42) is an electric motor or a hydraulic motor.

9. The drive unit (40) according to claim 1, wherein the driving motor (42) is arranged in the drive unit (40) either coaxially with respect to an axle (14) of an undercarriage (10), or in the form of a wheel hub motor.

10. A method of controlling a drive unit (40) for an aircraft ground wheel (12) associated with a brake unit (30) for braking the ground wheel (12), which the drive unit (40) comprises a cooling system which is driven by a driving motor (42) of the drive unit (40), the method comprising:
when an operating condition of the ground wheel (12) is switched from a propulsion mode to a non-propulsion mode, decoupling the driving motor (42) from the ground wheel (12) and increasing the rotational speed of the driving motor (42) to increase the amount of generated drive cooling air (54),
wherein the drive cooling unit (52) is configured to generate a drive cooling air stream (54),
wherein the brake cooling unit (72, 74) is configured to generate the brake cooling air stream (64), and
wherein the cooling system further includes a venturi section (74), the venturi section (74) being configured either to generate a low pressure (LP) for sucking in the brake cooling air stream (64) as a sucked air stream by means of the drive cooling air stream (54) as a blowing air stream, or to generate the low pressure (LP) for sucking in the drive cooling air stream (54) as the sucked air stream by means of the brake cooling air stream (64) as the blowing air stream.

11. The method according to claim 10, wherein when the operating condition of the ground wheel (12) is switched from the non-propulsion mode to the propulsion mode, the rotational speed of the driving motor (42) is synchronized with an actual speed of the ground wheel (12) and the driving motor (42) is coupled with the ground wheel (42) for driving the ground wheel (42).

12. An aircraft undercarriage (10), comprising:
at least one wheel axle (14) supporting at least one ground wheel (12a or 12b);
a brake unit associated to the at least one ground wheel (12a or 12b); and
the drive unit (40) according to claim 1 associated with the at least one ground wheel (12a or 12b).

13. The aircraft undercarriage (10) according to claim 12, further comprising or being operationally connected to a control unit; wherein the control unit is configured to carry out a control method in which the cooling system is driven by the driving motor (42) of the drive unit (40), the method comprising decoupling the driving motor (42) from the ground wheel (12) and increasing the rotational speed of the driving motor (42) to increase the amount of generated drive cooling air (54), when an operating condition of the ground wheel (12) is switched from a propulsion mode to a non-propulsion mode.

14. The aircraft undercarriage (10) according to claim 12, wherein the undercarriage (10) comprises a pair of ground wheels (12a, 12b) supported by one wheel axle (14) and wherein each of the ground wheels (12a, 12b) comprises a rim (18) for installation of a tire (20) and a wheel disk (22) by which the ground wheels (12a, 12b) are connectable to a hub (23) in such a way that the ground wheels are supported on the axle (14), the wheel disk (22) and the rim (18) forming with respect to the undercarriage (10) an inside space (26) and an outside space (28), respectively, the inside space (26) and the outside space (28) being separated by the wheel disk (22), the drive unit (40) being configured to be accommodated in the outside cup-like space (28), and the brake unit (30) being installed in the inside space (26).

15. The aircraft undercarriage (10) according to claim 14, wherein the drive unit (40) comprises a casing (56) and is configured such that, in a situation where the drive unit (40) is mounted to the ground wheel (12a, 12b), a gap is formed in the outside space (28) between the rim (18) and the casing (56) of the drive unit (40), the cooling system being configured to blow the drive cooling air stream (54) and/or the brake cooling air stream (64) away from the outside space (28) through the gap.

* * * * *